UNITED STATES PATENT OFFICE 2,514,233

PROCESS FOR THE MANUFACTURE OF COLOR PHOTOGRAPHIC IMAGES

Béla Gaspar, Hollywood, Calif., assignor to Chromogen, Incorporated, a corporation of Nevada No Drawing. Original application August 8, 1940, Serial No. 351,907. Divided and this application January 14, 1944, Serial No. 518,256. In Great Britain August 9, 1939

7 Claims. (Cl. 95—6)

The present application is a division of my Patent 2,361,541 which relates to the production of dye images from photographic silver images by a process which comprises the synthesis of an azo dye in the exposed photographic emulsion layer.

In my prior United States Letters Patent No. 2,071,688, dated February 23, 1937, I have described and claimed a method of producing color photographic images utilizing light sensitive silver halide layers containing azo dye components in which process the photographic layer is exposed and developed to produce a silver image and is subjected to two treatments, the first treatment consisting in the conversion of a dye-forming substance into a dye and the second treatment consisting in the local dye destruction at the required points in proportion to the silver image. Thus, for example, a diazo compound is transformed into an azo dye by coupling with a phenol; or a phenol or other azo coupler is transformed into an azo dye by treating with a diazo compound, the azo dyes thus formed then being destroyed locally.

In my prior British Patent Specification No. 416,660 as well as in Patent 2,071,688 just mentioned, I have also described and claimed an alternative process in which the first treatment consists in the local destruction of the dye-forming substance, the second treatment then consisting in the conversion of the remaining dye-forming substance into the dye.

If, for carrying out the processes referred to above, a layer is used which contains either an azo coupler or a diazo compound but not both, the production of the dye image can be performed either by coupling with a diazo compound or coupling with an azo coupler, respectively, and the destruction at the image parts of the dye thereby obtained.

If, however, the layer contains a diazotizable amino compound and an azo coupler, the process includes the step of diazotization, in addition to coupling and destruction at the image parts of either the diazo compound or the dye.

The present invention relates to the treatment of photographic layers that either comprise both a diazotizable amino compound and a compound that is capable of coupling with diazo compounds or that comprise a compound which is both diazotizable and then capable of coupling with itself. The operations of diazotization, coupling and destruction at the image parts are not carried out in three separate treating steps but with only two baths or even with one single bath.

This simplification of the process is rendered possible by the present invention which consists in imparting a triple function to the treating solution or a dual function to one of two treating solutions so that the same treating solution is capable of bringing about diazotization, coupling and destruction at the image parts or at least two of these effects. Different possibilities of carrying out the invention are illustrated by the following examples in which the metallic silver image is a photographic silver image produced in an exposed photographic layer and the dye image produced therefrom is produced by azo dye synthesis.

*Example 1.*—A photographic layer comprising a metallic silver image and the substance (p-aminobenzoyl)-p-amino-benzoyl-1-amino-8-naphthol-3.6-disulphonic acid having the following structural formula

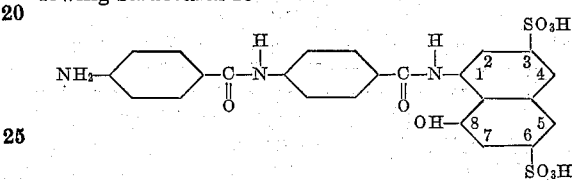

which is distributed diffusely throughout the layer is treated for about 5 minutes with a solution of 250 ccs. of a 0.25-normal sulphuric acid and 1 cc. of a 0.1 normal-sodium nitrite solution. The image is washed and immersed for about 5 minutes into a 2.5% thiocarbamide solution containing 2% acetic acid which causes coupling of the diazotized amino compound simultaneously with destruction at the points of the silver image. The silver image is thereafter removed in the usual manner by bleaching with cupric chloride solution and fixing. A reversed red dye image is thus obtained.

*Example 2.*—An image as used in Example 1 is treated with a solution of 20 ccs. 0.1-normal acetic acid with the addition of 0.1 cc. of a 0.1-normal sodium nitrite solution. Diazotization and coupling and the formation of an image occur within the same solution. After about 10 to 20 minutes the silver is removed from the dye image. The dye image can be improved by treating the layer prior to the removal of the silver with a dye destroying solution, such as a 5% hydrobromic acid solution.

*Example 3.*—A silver image as used in Example 1 is treated with a solution of 20 ccs. ½-normal acetic acid containing 5% sodium chloride and 0.1 cc. of a 0.1-normal sodium nitrite solution. After 20 minutes the silver image is removed by a cupric salt solution and fixing; a dye image is thus obtained.

*Example 4.*—A silver image as used in Example 1 is treated with 25 ccs. of a solution of 0.25-normal hydrobromic acid to which 0.1 cc. of a 0.1-normal sodium nitrite solution have been added which acts to diazotize and to destroy the diazonium compound at the points of the silver image. The layer is after-treated with a 0.25-normal sodium carbonate to reduce the acidity and cause the diazotized compound to couple. The silver is removed and a reversed dye image obtained.

From the foregoing examples it will be seen that the triple function of diazotizing, coupling and destruction of the dye or dye-forming substance is given to one single treating solution, or that two of these functions are given to the one of two treating baths employed in the examples.

Instead of the coupling component used in the examples other components may be used; for example, a mixture of a diazotizable amino compound, such as Diazo Light Yellow (described and claimed in my aforementioned Patent 2,071,688 as a compound which fastly dyes a silver halide emulsion), and a coupling compound, such as carbonyl-bis-{8-[4-(4-amino - benzamino) - benzamino]-naththol-(1)-disulphonic acid (3,6)}, (Beilstein's Handbuch der Organischen Chemi, 4th ed., 1933, Suppl. vol. XIV, page 759, Formula XI on page 758), may be used which are distributed diffusely throughout a layer.

The process of the present invention for the production of color photographic images is especially useful for the manufacture of multi-color images in a plurality of layers. In the multilayer material used for this process some or all of the layers may contain a dye-forming substance capable of coupling with itself or some or all of the layers may contain a diazotizable amino compound and a compound that is capable of coupling with diazo compounds.

I claim:

1. The process of producing a reversed dyestuff image in a photographic layer comprising a silver image, an azo coupling component, and a diazotizable amine, which comprises treating said layer with a solution consisting of an aqueous nitrite solution acidified with a dilute acid to effect diazotization of said diazotizable amine and formation of a diazonium compound only at the points opposite to the silver image, the acid component of said acidified solution being present in a concentration sufficient to cause selective destruction of such diazonium compound in the presence of metallic silver and to suppress coupling of such diazonium compound with said coupler and thereafter treating said layer with an alkaline aqueous solution to effect coupling of said diazonium compound and said coupler to produce a dyestuff image at the points opposite to the points of said silver image.

2. A process for producing a reversed dyestuff image in a photographic layer comprising a silver image and a diffusely distributed diazotizable amino compound, which comprises treating said layer in the presence of a compound capable of coupling with diazo compounds with a single solution to effect diazotization of said diazotizable amino compound thereby forming a diazonium compound only at the points opposite to the silver image, said solution comprising an aqueous nitrite solution acidified with a dilute acid, the acid component of said acidified solution being present in a concentration sufficient to cause selective destruction of such diazonium compound in the presence of metallic silver and to suppress coupling of such diazonium compound with said coupling compound and thereafter treating said layer with an aqueous solution of a strong base and a weak acid which causes the diazonium compound to couple with said coupling compound to form a reversed dye image in said layer.

3. A process for producing a reversed dyestuff image in a photographic layer comprising a silver image together with a diazotizable amino compound and a compound capable of coupling with diazo compounds, said compounds being diffusely distributed throughout said layer, which comprises treating said layer with a single solution to effect diazotization of said diazotizable amino compound thereby forming a diazonium compound only at the points opposite to the silver image, said solution comprising an aqueous nitrite solution acidified with a dilute acid, the acid component of said acidified solution being present in a concentration sufficient to cause selective destruction of such diazonium compound in the presence of metallic silver and to suppress coupling of such diazonium compound with said coupling compound and thereafter treating said layer with an aqueous solution of a strong base and a weak acid which causes the diazonium compound to couple with said coupling compound to form a reversed dye image in said layer.

4. A process for producing a reversed dyestuff image in a photographic layer comprising a silver image and a diffusely distributed amino compound which is both diazotizable and then capable of coupling with itself to form a dye, which comprises treating said layer with a single solution to effect diazotization of said diazotizable amino compound thereby forming a diazonium compound only at the points opposite to the silver image, said solution comprising an aqueous nitrite solution acidified with a dilute acid, the acid component of said acidified solution being present in a concentration sufficient to cause selective destruction of such diazonium compound in the presence of metallic silver and to suppress coupling of such diazonium compound with said coupling compound and thereafter treating said layer with an aqueous solution of a strong base and a weak acid which causes the diazonium compound to couple with said coupling compound to form a reversed dye image in said layer.

5. A process for producing a reversed dyestuff image in a photographic layer comprising a silver image and diffusely distributed Diazo Light Yellow, which comprises treating said layer in the presence of a compound capable of coupling with diazo compounds with a single solution to effect diazotization of said Diazo Light Yellow thereby forming a diazonium compound only at the points opposite to the silver image, said solution comprising an aqueous nitrite solution acidified with a dilute acid, the acid component of said acidified solution being present in a concentration sufficient to cause selective destruction of such diazonium compound in the presence of metallic silver and to suppress coupling of such diazonium compound with said coupling compound and thereafter treating said layer with an aqueous solution of a strong base and a weak acid which causes the diazonium compound to couple with said coupling compound to form a reversed dye image in said layer.

6. A process for producing a reversed dyestuff image in a photographic layer comprising a silver image and a diffusely distributed diazotizable amino compound possessing dyeing properties with respect to the emulsion layer, which comprises treating said layer in the presence of a compound capable of coupling with diazo compounds with a single solution to effect diazotization of said diazotizable amino compound thereby forming a diazonium compound only at the points opposite to the silver image, said solution comprising an aqueous nitrite solution acidified with a dilute acid, the acid component of said acidified solution being present in a concentration sufficient to cause selective destruction of such diazonium compound in the presence of metallic silver and to suppress coupling of such diazonium compound with said coupling compound and thereafter treating said layer with an aqueous solution of a strong base and a weak acid which causes the diazonium compound to couple with said coupling compound to form a reversed dye image in said layer.

7. A process for producing a reversed dyestuff image in a photographic layer comprising a silver image and a diffusely distributed diazotizable amino compound, which comprises treating said layer in the presence of a compound capable of coupling with diazo compounds with a single solution to effect diazotization of said diazotizable amino compound thereby forming a diazonium compound only at the points opposite to the silver image, said solution comprising an aqueous nitrite solution acidified with a dilute acid selected from the group consisting of hydrobromic and hydrochloric acid, the acid component of said acidified solution being present in a concentration sufficient to cause selective destruction of such diazonium compound in the presence of metallic silver and to suppress coupling of such diazonium compound with said coupling compound and thereafter treating said layer with an aqueous solution of a strong base and a weak acid which causes the diazonium compound to couple with said coupling compound to form a reversed dye image in said layer.

BÉLA GASPAR.

REFERENCES CITED

The following references are of record in the file of this patent:

UNITED STATES PATENTS

| Number | Name | Date |
|---|---|---|
| 1,758,572 | Lierg | May 13, 1930 |
| 2,071,688 | Gaspar | Feb. 23, 1937 |
| 2,179,228 | Eggert et al. | Nov. 7, 1939 |
| 2,361,541 | Gaspar | Oct. 31, 1944 |

FOREIGN PATENTS

| Number | Country | Date |
|---|---|---|
| 298,979 | Great Britain | Feb. 20, 1930 |
| 416,566 | Great Britain | Sept. 10, 1934 |
| 416,660 | Great Britain | Sept. 10, 1934 |
| 503,824 | Great Britain | Apr. 11, 1939 |